United States Patent [19]

Koos

[11] Patent Number: 4,520,444
[45] Date of Patent: May 28, 1985

[54] APPARATUS FOR MEASURING BRAKING ACTIONS OF AN AUTOMOTIVE VEHICLE

[75] Inventor: Rudolf Koos, Budapest, Hungary

[73] Assignee: Metripond Merleggyar, Hodmezovasarhely, Hungary

[21] Appl. No.: 396,443

[22] Filed: Jul. 8, 1982

[30] Foreign Application Priority Data

Jul. 22, 1981 [HU] Hungary .................. 2135/81

[51] Int. Cl.³ .................. G01L 5/28; G06F 15/20
[52] U.S. Cl. .................. 364/426; 73/117; 73/126
[58] Field of Search ........... 364/424, 426; 73/117, 73/121–126

[56] References Cited

U.S. PATENT DOCUMENTS

| | | | |
|---|---|---|---|
| 3,498,122 | 3/1970 | Odier et al. | 73/117 |
| 3,602,042 | 8/1971 | Mitchell | 73/126 |
| 3,651,690 | 3/1972 | Pagdin et al. | 73/117 |
| 3,995,475 | 12/1976 | Cline | 73/126 |
| 4,011,751 | 3/1977 | Weiss et al. | 73/122 |
| 4,121,452 | 10/1978 | Wakabayashi et al. | 73/117 |

FOREIGN PATENT DOCUMENTS 883534 11/1961 United Kingdom ............ 73/123

*Primary Examiner*—Gary Chin
*Attorney, Agent, or Firm*—Young & Thompson

[57] ABSTRACT

Apparatus for measuring braking actions of an automotive vehicle wherein the braking power is measured between the ground and a braked wheel of the automotive vehicle, and wherein data required for identification of the automotive vehicle are recorded, this process being characterized in that for each wheel (7), the weight resting on the wheel is likewise measured, and that further parameters of the braking action are calculated on the basis of the measured values. The apparatus comprises a braking power test stand, and a computing unit, with storage, indicator and/or recording units. The apparatus also has weight measuring units (1), and an output of each of the braking power test stand (6) and of the weight measuring units (1) is connected to inputs of the computing unit (10). An output of each of the computing unit (10) and the storage unit is connected to a respective input of the indicator and/or recording unit (11).

2 Claims, 1 Drawing Figure

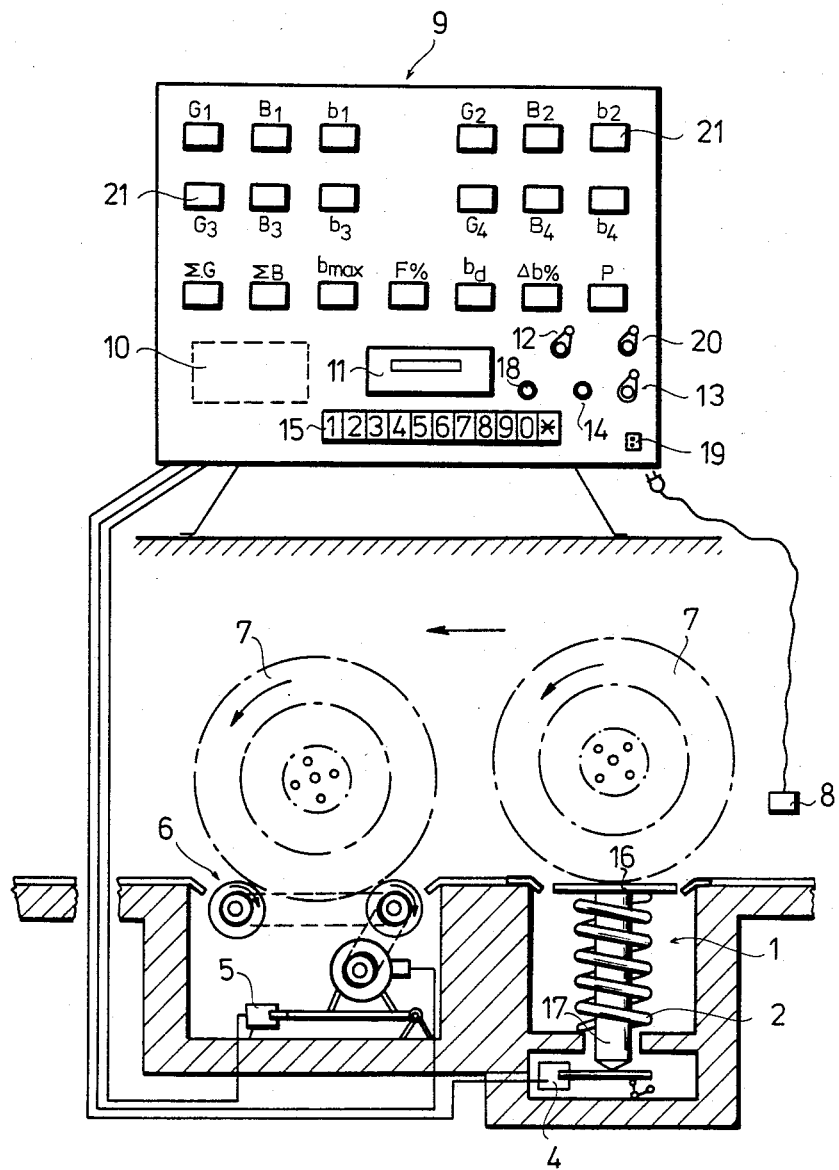

APPARATUS FOR MEASURING BRAKING ACTIONS OF AN AUTOMOTIVE VEHICLE

FIELD OF THE INVENTION

The invention relates to a process for measuring braking actions of an automotive vehicle. The invention also concerns an apparatus for measuring these braking actions of the automotive vehicle.

DESCRIPTION OF THE PRIOR ART

As is known, the braking actions, primarily the brake deceleration of an automotive vehicle, can be measured by means of nonstationary devices operating in most cases according to the principle of a liquid column or kinetic mass spring. These devices have the important advantage of a simple and inexpensive design. However, one disadvantage resides in that the measurements can only be executed with moving vehicles, for which purpose a testing track is required which, due to the large traffic density, is not always available. Besides, these measurements consume relatively large amounts of working time and fuel.

The gravest disadvantage of the nonstationary devices, however, must be seen in that they do not yield a value for the individual wheels, but rather only for the vehicle as a whole. The driving characteristics of the vehicle are, as is known, determined by the braking characteristics of the individual wheels; for this reason, these values must be determined for each wheel separately.

The stationary braking power test stands, which have become increasingly popular within the last two decades, have the purpose of eliminating the difficulties existing with the nonstationary devices. The stationary braking power test stands are, in most cases, equipped with pairs of rollers driven by means of an electric motor as described, for example, in East German Patent No. 89,022. The wheels of the front axle and the rear axle are tested separately; by braking of the wheels located between the roller pair, a braking power is produced on the contact surfaces of the wheels and the rollers.

The braking power acting on the electric motors of the roller pairs is measured and transmitted mechanically or hydraulically or electronically to the indicator dials. Thus, with these devices, the braking power is measured separately for each wheel and indicated. In several types, a brake pedal dynamometer is also connected to the test stand. With these devices, the measurements of the braking system of an automotive vehicle can be performed in the workshop, using the auto-diagnostic-technological series of machines. The rough errors of the wheel brakes can be filtered out.

One disadvantage on these devices worth mentioning is that they are only suitable for determining the braking power, and no other braking actions, such as braking deceleration, extent of braking, etc. The sometimes considerable differences in the loads on the individual wheels are not taken into account, since the load on the individual wheels is not measured. Therefore, only the braking power is indicated which can be produced at the given load by the static friction force between the rollers and the rubber tires. The braking power producible by the braking system, i.e. the deceleration attained, which is the actually required information, is not measured. In the conventional testing procedures, this aspect is adjudged subjectively by the testing personnel, and the empirical values of the individual types of automotive vehicles are compared with one another.

The above-mentioned problem in testing is even more aggravated in the more recent automotive vehicle models provided with load-dependent brake power regulation systems. These brake power regulation systems cannot be adjusted and controlled with the conventional measuring units, since, as mentioned above, the load on the wheels is not included in the testing procedure.

OBJECTS OF THE INVENTION

The invention has the purpose of overcoming the inadequacies of the conventional measuring methods and measuring devices for the braking actions of an automotive vehicle.

It is an object of the invention to provide apparatus making it possible to raise the technical level of the brake testing operations, affording the possibility of measuring other braking actions in addition to the braking power.

SUMMARY OF THE INVENTION

The realization, which has led to the invention, can be seen in that it is intended to measure, during brake tests, not only the braking power, but also the weight exerted on a wheel of the automotive vehicle to be tested, and to obtain additional parameters on the basis of the measured values by means of calculations.

In this invention, the braking power is measured between the ground and a braked wheel of the automotive vehicle, and the data required for identifying the automotive vehicle are recorded, this process being characterized in that, in case of each wheel, it is not only the braking power which is measured, but also the weight resting on the wheel, and in that, on the basis of the measured values, additional parameters of the braking actions are determined by calculations. The significance of this solution resides in that this process affords the possibility to consider also the weight resting on the individual wheels, and to determine additional parameters characteristic for the braking actions of an automotive vehicle by means of calculations with the aid of the conventional equations.

The measurements executed on the wheels can be supplemented according to this invention by measuring the force of the brake pedal; in this connection, the force exerted by the foot on the brake pedal required for a given braking effect can be determined.

EXPLANATION OF THE INVENTION

The calculated values, as well as the measured values and the data required for identification of the automotive vehicle can be indicated and/or recorded according to this invention. The records can then be utilized, for example, in the official technical inspections.

It is possible to determine, on the basis of the process of this invention, as additional parameters of braking actions, the brake deceleration value, the percentage of braking, and the percentage of deviation of the brake decelerations of the individual wheels.

The procedure according to this invention is as follows: With each wheel of the automotive vehicle, the perpendicular load weight G and, conventionally, the braking power B between ground and wheel are measured. From these data, the brake deceleration b can be calculated as follows:

$$b = \frac{B}{G} \cdot g \left[ \frac{m}{s^2} \right] \quad [1]$$

wherein
B is the braking force in N,
G is the weight in N, and
g is the gravitational constant: 9.81 in m/s².

In several countries, the percentage value of braking F is the accepted standard, instead of the brake deceleration b, this value indicating the relationship of the attained braking force B to the weight G:

$$F = \frac{B}{G} \cdot 100 \; [\%]$$

Taking Formula [1] into account:

$$F = \frac{b}{g} \cdot 100 \; [\%]$$

and, if g = 10 m/s², then the following applies:

$$F = \frac{b}{10} \cdot 100 = b \cdot 10 \; [\%]$$

As is generally known, a maximum brake deceleration $b_{max}$ can be determined during a braking process. Furthermore, an average brake deceleration $b_d$ can be calculated, indicating the average deceleration of the automotive vehicle from beginning to end of the braking process.

The average deceleration depends primarily on the technical condition of the braking device of the automotive vehicle and thereafter on the ability and skill of the driver, as well as on the speed of the automotive vehicle before the beginning of braking, and on the displacement of the center of gravity.

The official regulations fix a specific, average deceleration.

According to the pertinent literature, the average deceleration $b_d$ is fixed to be 60–80% of the maximum deceleration $b_{max}$, the mean value being:

$$b_d = 0.7 \cdot b_{max}$$

The present invention relates—as mentioned above—likewise to a device for measuring braking actions of an automotive vehicle with a braking power test stand, a computing unit, a storage and recording unit for the identifying parameters of the automotive vehicle, and an indicator and/or recording unit. The characteristic further development in this connection resides in that the device is also equipped with weight measuring units, the number of which corresponds to the number of wheels arranged on an axle of the automotive vehicle to be tested; and that one output of the braking power test stand and respectively one output of the weight measuring units is connected to respectively one input of the computing unit, as well as one output of the computing unit and one output of the storage and recording unit for the identifying variables of the automotive vehicle are connected to respectively one input of the indicator and/or recording unit. The greatest significance of this solution resides in that the further parameters of the braking actions can be determined in a simple manner along the lines of the process of this invention. Therefore, the device is well suitable for realizing the process.

The apparatus is furthermore constructed so that the existing testing units can be supplemented with the apparatus of this invention. Thereby even the conventional test stands can thus be made suitable for executing the process.

The apparatus can also be provided, according to this invention, with a measuring unit of the brake pedal force; the output of this unit can be connected directly or through the computing unit to an input of the indicating and/or recording unit.

DESCRIPTION OF THE DRAWING

Additional details of the invention will be explained in greater detail with reference to an embodiment as shown in the appended drawing. The FIGURE of the drawing illustrates schematically an example of the apparatus of this invention.

DESCRIPTION OF A PREFERRED EMBODIMENT

As can be seen from the FIGURE, the apparatus of this invention consists of two parts: a "mechanical" part is at the bottom, an "electronic" part is here illustrated at the top. The main components of the "mechanical" part are a weight measuring unit 1 and a braking power test stand 6. The weight measuring unit 1 is designed as a scale and has a plate 16 on which a wheel 7 of the automotive vehicle to be tested is placed. The plate 16 is connected by way of a column 17 to a displacement feeler 4 under the relief action of a spring 2.

The braking power test stand 6 is a conventional component consisting of a pair of rollers driven by an electric motor and coming into contact with the wheel 7. The electric motor is connected to a feeler 5.

The displacement feeler 4 and the feeler 5 are designed as a type of electromechanical transducer: they convert the mechanical signal into an electrical signal. The mechanical signal is the displacement proportional to the weighting force (the weight at the displacement feeler 4 and the braking force at the feeler 5).

The "electronic" part of the apparatus of this invention is fashioned as an instrument panel 9, housing a computing unit 10, an indicating and/or recording unit 11, and a storage and recording unit, not shown, for the identifying data of the automotive vehicle to be tested. The indicating and/or recording unit 11 has readily viewable, separate dials 21 for the individual parameters to be indicated, these dials being distinguished from one another by various labels.

For the two different cases of front axle and rear axle, a changeover switch 12 is provided. The rotation of the rollers of the braking test stand 6 are started by means of a switch 13, and also cut off by the latter; this switch can also be designed as a push button. A button 14 is installed for the computing operation, while additional data can be introduced by an alphanumeric keyboard 15.

The apparatus can also be equipped with a pedal force measuring unit 8 coupled by means of a connector 19 of the instrument panel 9 directly or with the interposition of the computing unit 10 to an input of the indicating and/or recording unit 11. The apparatus is supplied with main voltage via a main switch 20.

In a measuring device, the number of weight measuring units 1 and braking power test stands 6 installed must correspond to the number of wheels 7 present on an axle of the automotive vehicle to be tested. The wheels 7 on one axle are being tested at the same time, but separately from one another.

Respectively one output of the weight measuring units 1 and respectively one output of the braking power test stands 6 are connected to respectively one input of the computing unit 10. One output of the computing unit 10 and one output of the storage and recording unit for the identifying data of the automotive vehicle are connected to respectively one input of the indicating and/or recording unit 11.

The process of this invention will be explained in greater detail by describing the mode of operation of the apparatus.

The vehicle to be tested is slowly driven in the driving direction onto the apparatus. The brakes of the wheels 7 of the front axle are tested first. The operator of the apparatus, after turning on the main switch 20, selects "front axle" by means of the changeover switch 12. When the vehicle drives over the plate 16 of the weight measuring unit 1, the weight actually resting on the wheel 7 is measured and registered by the displacement feeler 4; the electrical signal is transmitted to the instrument panel 9 and stored therein. The wheel 7 thereafter enters between the rollers of the braking power test stand 6, and the pedal force measuring unit 8 is installed. The rotation of the roller pair is started with the switch 13. The brake pedal is depressed, and the braking force is measured with the feeler 5. The values are further stored and indicated simultaneously in the indicators 21 of the indicating and/or recording unit 11. The rotation of the roller pair is subsequently turned off by means of the switch 13. This completes the testing of the braking system pertaining to the front axle. The following values are measured, stored, indicated and/or recorded: the weights $G_1$ and $G_2$ to which two wheels 7 are exposed; the braking forces $B_1$ and $B_2$; and the pedal force P.

The vehicle is further driven in the driving direction. At the same time, the changeover switch 12 is placed in the position "rear axle", and the measuring procedure is repeated analogously to the manner set forth above. The measured, stored, indicated and/or recorded values are the following for the wheels 7 of the rear axle: the weights $G_3$ and $G_4$; the braking forces $B_3$ and $B_4$; and optionally the pedal force P.

After termination of the measuring procedure at the rear axle, the pedal force measuring unit is removed, and the measurements on one automotive vehicle are complete. At this point, all data are available for commencing the computing procedure, which takes place by activating the button 14.

For each wheel 7, the braking deceleration b is calculated based on equation [1].

The resultant braking force B is derived from the sum of the braking forces $B_1$ through $B_4$ of the individual wheels 7:

$$B = B_1 + B_2 + B_3 + B_4$$

The resultant weight G of the automotive vehicle is:

$$G = G_1 + G_2 + G_3 + G_4$$

The maximum braking deceleration $b_{max}$ attainable by means of the vehicle is:

$$b_{max} = \frac{B}{G} \cdot 9.81$$

The average braking deceleration $b_d$ realized by means of the vehicle is:

$$b_d = 0.7 \cdot b_{max}$$

The braking action F in percent [$g = 10$ m/s$^2$]

$$F = \frac{b_{max}}{10} \cdot 100 = b_{max} \cdot 10 \, [\%]$$

By comparing the individual braking deceleration values b, the differences in deceleration can be readily determined. The largest deceleration difference $\Delta b_{max}$ is obtained by subtraction of the smallest calculated value from the largest. For this value, a maximum is normally prescribed, which must not be exceeded so as not to endanger the traffic safety of the vehicle.

$$\Delta b_{max} = b_x - b_y$$

wherein
$b_x$ is the largest of the calculated deceleration values and
$b_y$ is the smallest of the calculated deceleration values.

Furthermore, the ratio of the difference with respect to the attained deceleration can be determined in percent:

$$b \, [\%] = \frac{\Delta b_{max}}{b_{max}} \cdot 100$$

The calculated values are also indicated by the dials 21. As mentioned above, the measured as well as the calculated values can be recorded at the same time, and the recorded data can find further use, for example, in the official technical inspection of the automotive vehicle. For this purpose, the data required for identification of the automotive vehicle, such as the license plate number, the engine serial number, the body serial number, as well as the data, the code name of the operator, etc., can be fed via the alphanumerical keyboard 15 and incorporated into the record.

The above embodiment describes an apparatus with which automotive vehicles equipped with four braked wheels 7 can be tested. The apparatus can, of course, also be adapted without any difficulties whatsoever for other vehicles. It is furthermore possible to test not only the foot brake but also the hand brake.

On account of the compact construction of the apparatus, it is possible to design same not only as a fixed device but also as a portable unit. For this purpose, it is possible, for example, to build the weight measurihg unit 1 and the braking power test stand 6 as separate mechanical components.

Another advantage of the invention worth mentioning is that it is possible to determine not only the braking force but also the braking deceleration of the automotive vehicle in a stationary device. The regulation values can thereby be compared, without subjective evaluation, with the measured and calculated values. The values furthermore yield information on the technical condition of the braking system. The sometimes considerable differences in wheel loads will not adversely affect the testing operations.

What is claimed is:

1. In apparatus for measuring braking actions of an automotive vehicle with a braking power test stand, a computing unit for computing braking characteristics, a storage unit for storing identifying data of the automotive vehicle, and an indicating or recording unit for indicating or recording braking characteristics; the improvement comprising a plurality of weight measuring units for respectively measuring the weight exerted on each wheel of said vehicle (1), the number of which weight measuring units corresponds to the number of wheels (7) present on one axle of the automotive vehicle to be tested; one output of the braking power test stand (6) and respectively one output of each of the weight measuring units (1) being connected to respective separate inputs of the computing unit (10) for computing the braking characteristics of each wheel on said one axle, and one output of the computing unit (10) and one output of the storage unit for identifying data of the automotive vehicle being connected to respective separate inputs of the indicating or recording unit (11) for separately indicating or recording the braking characteristics of each wheel of said one axle.

2. Apparatus according to claim 1, further including a pedal force measuring unit (8), the output of which is connected directly or through the computing unit (10) to an input of the indicating or recording unit (11) for indicating or recording the pedal force.

* * * * *